US006928889B2

(12) United States Patent
Kojima et al.

(10) Patent No.: US 6,928,889 B2
(45) Date of Patent: Aug. 16, 2005

(54) OCCUPANT DETECTION SYSTEM (75) Inventors: Mikihito Kojima, Saitama (JP);
Kazutomo Isonaga, Saitama (JP);
Harutomi Nishide, Saitama (JP);
Nobuhiro Koyota, Saitama (JP);
Yoshitaka Suzuki, Saitama (JP);
Mitsugu Tosa, Saitama (JP); Makoto Nagai, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/637,287

(22) Filed: Aug. 8, 2003

(65) Prior Publication Data
US 2004/0040390 A1 Mar. 4, 2004

(30) Foreign Application Priority Data
Aug. 30, 2002 (JP) ........................................ 2002-252263

(51) Int. Cl.$^7$ .............................. G01F 1/78; G01F 1/80
(52) U.S. Cl. ................................................. 73/862.351
(58) Field of Search ............................ 73/862–862.68; 177/144, 136; 180/273, 282; 280/735; 701/45; 340/667, 562

(56) References Cited

U.S. PATENT DOCUMENTS

| 5,929,390 A | * | 7/1999 | Naito et al. ............ 73/862.627 |
| 6,323,444 B1 | * | 11/2001 | Aoki .......................... 177/144 |
| 6,563,429 B2 | * | 5/2003 | Sakai et al. .................. 340/667 |

FOREIGN PATENT DOCUMENTS

JP    2000-258233    9/2000

* cited by examiner

Primary Examiner—Max Noori
Assistant Examiner—Takisha Miller
(74) Attorney, Agent, or Firm—Carrier, Blackman & Associates, P.C.; Joseph P. Carrier; William D. Blackman (57) ABSTRACT

An occupant detection system, includes a sensor, a controller, a base frame, and a heat insulator. In this occupant detection system, the sensor measures a weight of an occupant sitting on the vehicle seat. The controller detects a presence of the occupant on the vehicle seat. The base frame is fixed to one of a vehicle seat or a vehicle body and accommodates the sensor. The heat insulator is provided on the base frame and prevents a heat transfer between the base frame and the sensor.

19 Claims, 4 Drawing Sheets

OCCUPANT DETECTION SYSTEM

BACKGROUND OF THE INVENTION

1. Field of the Invention

The present invention relates to an occupant detection system, which detects the presence or absence of the occupant on the vehicle seat.

2. Description of Relevant Art

As an example of an apparatus for detecting the presence or absence of the occupant on the vehicle seat, the apparatus, in which the presence or absence the occupant is detected by measuring the weight applied to the vehicle seat, can be cited. Among these kinds of apparatuses, the seat weight measuring device disclosed in Japanese unexamined patent publication JP2000-258233 can be cited as an example.

This weight measuring device disclosed in this publication has a load sensor and a deflection absorbing mechanism. The load sensor converts the weight of the vehicle seat into an electrical signal. The deflection absorbing mechanism is provided between the vehicle seat and the load sensor. This deflection absorbing mechanism absorbs the creep or deflection caused by the weight applied to the vehicle seat, and transmits moment of force brought out from the weight through an arm.

The load sensor disclosed in this publication is a strain gage composed of electric wirings and a plate spring, and is joined with a movable part of the arm. In this weight measuring device, one end of this arm is fixed at the vehicle side, and the other end of this arm is connected to the strain gage (load sensor) through a movable part Here, this movable part is displaced when the arm is turned by the load applied from the rail of the vehicle seat.

Thus, when the vehicle seat receives a load and the movable part of arm is moved as a result of the turn of the arm, a moment of force is applied to the load sensor. In this occasion, the amount of the load applied to the vehicle seat is measured by processing the electrical signal, which is obtained from the strain gages and is fluctuated in compliance with the amount of force.

The deflection absorbing mechanism is composed of a pin bracket and an arm. The pin bracket, which is positioned between the rail and arm, is joined with the arm through a pin with play.
By providing this play, the accidental deformation or the manufacturing error in the size of the vehicle parts is absorbed. Thus, the deflection absorbing mechanism does not transmit the load caused by the deformation to the load sensor 3.

In the conventional apparatus which measures the weight of the vehicle seat, however, if the ambient air temperature changes rapidly, the value of the resistance (hereinafter indicated as resistance value) of some strain gage may vary from other strain gages. This is because the heat transfer rate of each parts of the plate spring is different from other parts.

In this case, the resistance value obtained by the measurement is affected by the ambient air temperature due to the difference of the heat transfer rate.

Therefore, it has been required that the occupant detecting system perform the accurate measurement irrespective of the change of the ambient air temperature.

SUMMARY OF THE INVENTION

The present invention relates to an occupant detection system. This occupant detection system has a sensor, a controller, a base frame, and a heat insulator.

In this occupant detection system, the sensor measures a weight of an occupant sitting on a vehicle seat. The controller detects a presence of the occupant on the vehicle seat. The base frame is fixed to one of a vehicle seat or a vehicle body and accommodates the sensor. The heat insulator is provided on the base frame and prevents a heat transfer between the base frame and the sensor.

In this occupant detection system, since the heat insulator is provided on the base frame which accommodates the sensor therein, therefore, the temperature diffusion from the sensor or the heat input to the sensor is prevented. Thereby, the temperature of the sensor is stabilized, and thus the credibility of the data of the temperature is improved.

In this occupant detection system, preferably, a strain gage is used as the sensor, and this strain gage has a plurality of resistive elements. In the occupant detection system, still more preferably, a thermal conductive substance, which decreases a temperature difference among the resistors, is provided on the sensor.

According to the occupant detection system having these configurations, by arranging the thermal conductive substance, the temperature of each resistor is equalized. Thereby, the accuracy of the detection result of the sensor would be improved

DETAILED DESCRIPTION OF THE PREFERRED EMBODIMENTS

Occupant Detection System

The preferred embodiments of the present invention will be explained with reference to the attached drawings.

Figure 1A:
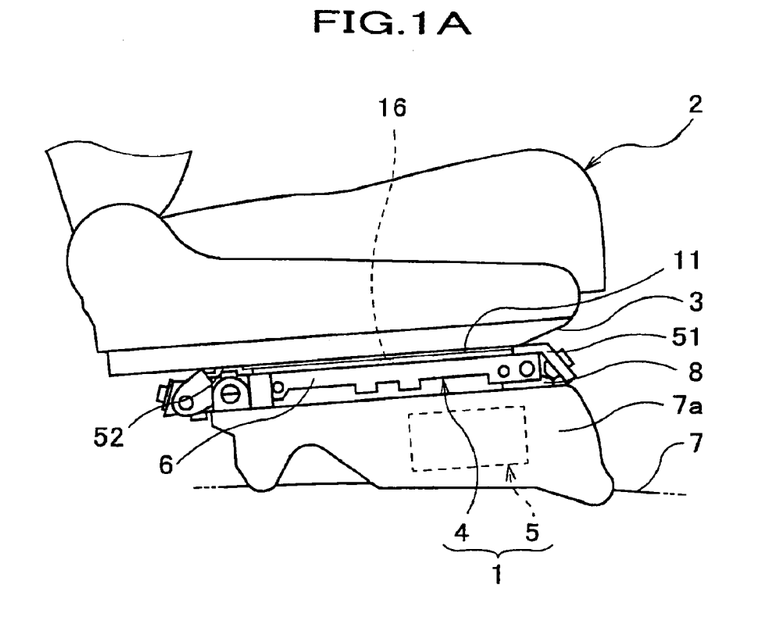
FIG. 1A is a side view of the occupant detection system, which is provided under the vehicle seat.
Figure 1B:
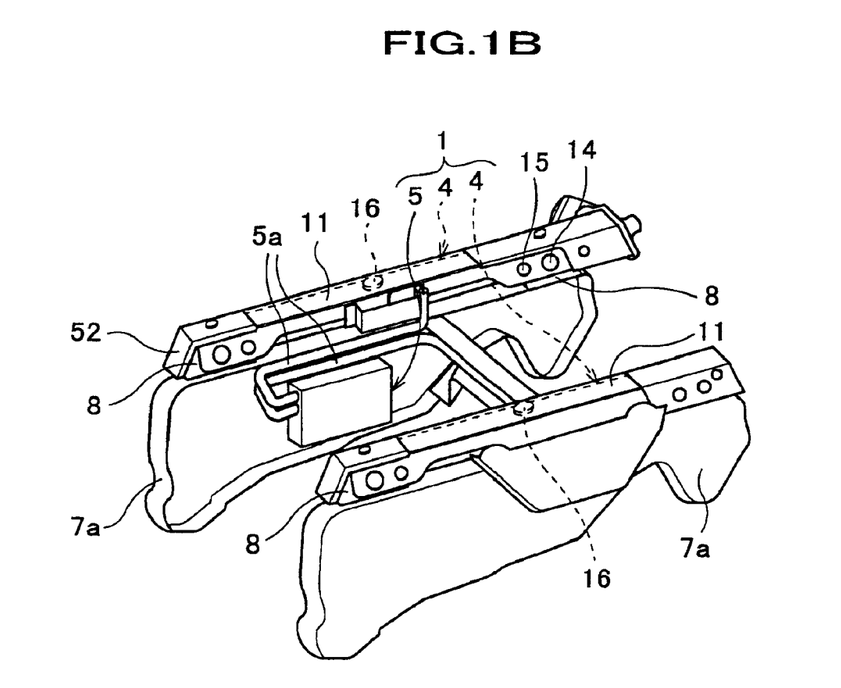
FIG. 1B is a perspective view which looks at the occupant detection system from an upper direction.

As shown in FIG. 1A and FIG. 1B, an occupant detection system 1 has weight detection units 4 and 4, and a control unit 5. One weight detection unit 4 is disposed at the bottom on the left side of a vehicle seat 2, and the other weight detection unit 4 is disposed at bottom on the right side of the vehicle seat 2. The control unit 5 connects with each weight detection unit 4 and 4, respectively, and measures a load to be applied to the vehicle seat 2. In other words, the control unit 5 performs the processing of the measured value obtained through the weight detection unit 4, and estimates the weight (load) applied to the vehicle seat 2. Then, the occupant detection unit determines whether an occupant is on the vehicle seat.

Weight Detection Unit

The detailed configuration of the weight detection unit 4 will be explained with reference to FIG. 2A–FIG. 3C.

Figure 2A:
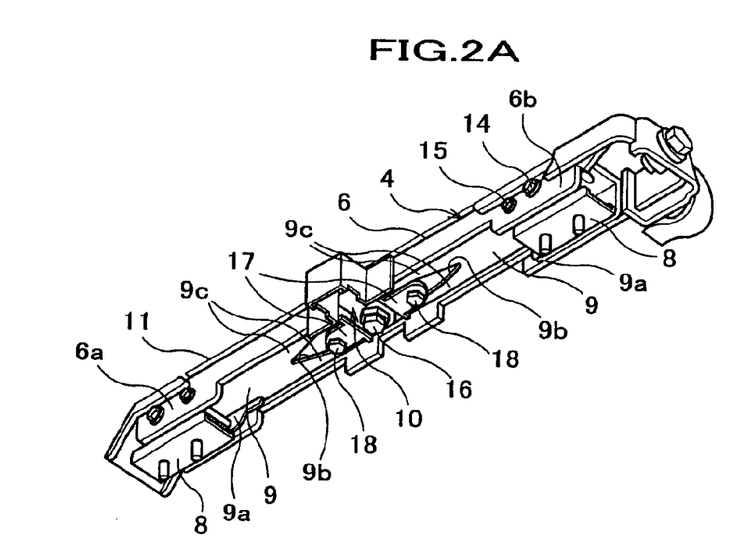
FIG. 2A is a perspective view which looks at a weight detection unit from a bottom direction.
Figure 2B:
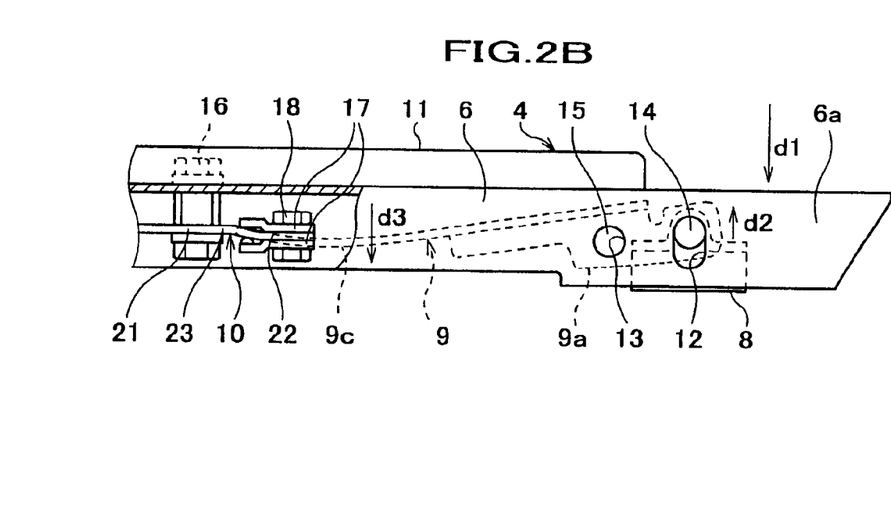
FIG. 2B is a partially enlarged cutaway side view of FIG. 2A.

The weight detection unit 4 has a base frame 6, brackets 8, a sensor plate 10, and an arm 9. A heat insulator 11 is provided on the top surface of the base frame 6.

The base frame 6 is fixed to the bottom of a vehicle seat 2, and is a U-like shaped member in sectional viewing. In other words, the base frame 6 is formed by bending both ends in the width direction of the rectangular plate so that the depression part is formed inside thereof. Here, this bend end part is defined as side.

The base frame 6 accommodates the bracket 8, the arm 9, and the sensor plate 10 in the depression part. This base frame 6 is fixed to the bottom of the vehicle seat 2 so that the depression part faces the opposite direction with respect to the vehicle seat 2.

Along hole 12 and a bolt hole 13 are formed on the side. The position where the long hole 12 and the bolt hole 13 are provided is the vicinity of end part 6a and 6b. The area of the long hole 12 is ranging along the up-and-down directions of the ride of the base frame 6.

A bracket pin 14, which is used for joining the bracket 8 with the arm 9, is inserted in the long hole 12.

A center pin 15, which acts as the rotation center (axis) of the arm 9, is inserted in the bolt hole 13.

In this base frame 6, the area of the long hole 12 is ranging along the up-and-down directions. Thus, the bracket pin 14 is allowed to move in the up-and-down directions by this long hole 12.

When the weight detection unit 4 receives a load, since the bracket pin 14 can slide along the long hole 12, the bracket 8 and the arm 9 are moved in the up-and-down directions with respect to this long hole 12.

The bracket 8 is a member of having a wide grounding area, and is positioned at both end parts (6a and 6b) in the longitudinal directions of the base frame 6. This bracket 8 is fixed at the fixing member 7a fixed at the vehicle body 7 (shown in FIG. 1A).

This bracket 8 has a hole (not shown), into which the bracket pin 14 is inserted. This hole and the long hole 12 of base frame 6 are overlapped with each other when the bracket 8 and the base frame 6 are assembled. Thus, the bracket 8 and base frame 6 are joined together by inserting the bracket pin 14 to this hole.

The arm 9 connects the sensor plate 10 with each of the brackets 8 and 8, and is provided at both side ends of the sensor plate 10. The load applied to each bracket 8 is carried to the sensor plate 10 through this arm 9. Side walls 9a and 9a are provided at both side ends of the arm 9. The position where each side wall 9a is provided is he vicinity of end part 6a (6b). The side wall 9a has holes (not shown), one of which coincides with the bolt hole 13 of the base frame 6, and the other of which coincides with he long hole 12 of the base frame 6.

A notched part 9b is formed on the arm 9 so that a pair of convection parts 9c and 9c are located in the sensor plate 10 side of the arm 9. The arm 9 is connected to the sensor plate 10 through the convection parts 9c and 9c.

As shown in FIG. 2B, the sensor plate 10, which has an electric circuit thereon, is positioned at the middle in the longitudinal direction of the base frame 6. The sensor plate 10 is fixed to the base frame 6 by the bolt 16 at the center part in the width direction thereof. Both side ends of this sensor plate 10 are joined with convection parts 9c and 9c, respectively, by bolts 18 and fixing brackets 17. Thereby, the sensor plate 10 connects with the bracket 8 fixed to the fixing member 7a of the vehicle body 7 through the arm 9.

Figure 3A:
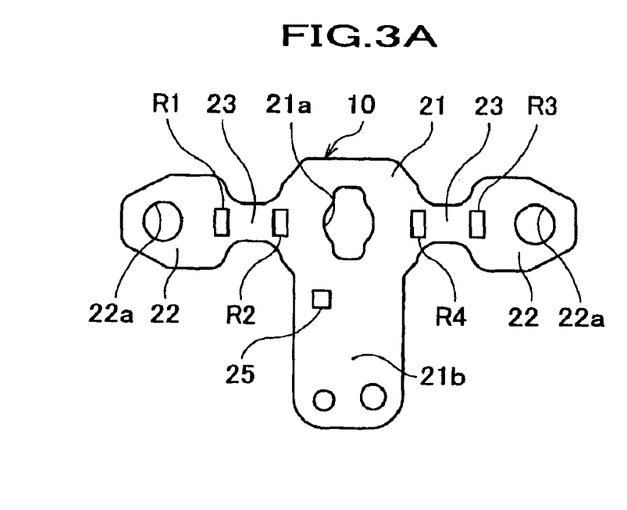
FIG. 3A is a bottom view of a sensor plate.
Figure 3B:
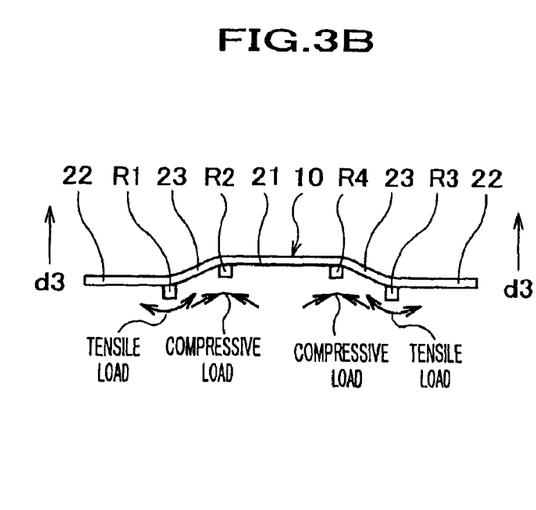
FIG. 3B is a side view of a sensor plate.
Figure 3C:
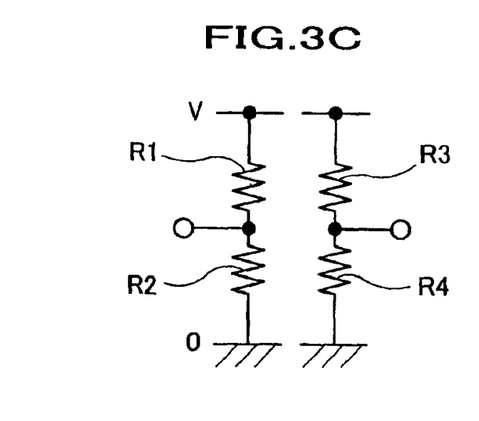
FIG. 3C is schematic view showing the electric circuit which is provided on the sensor plate.

Next, the more detailed explanation of the sensor plate 10 will be carried out with reference to FIG. 3.

As shown in FIG. 3A, the sensor plate 10 is composed of a fixing part 21 and displacement parts 22 and 22. The fixing part 21 has displacement parts 22 at both ends thereof. In other words, the fixing part 21 is positioned between the displacement parts 22 in this sensor plate 10.

The fixing part 21 connects with the displacement part 22 through a path 23. Since the width of this path is narrow, when the load is applied to the displacement part 22, the sensor plate 10 is deformed at the region of the path 23.

A bolt hole 21a formed on the midpoint of the fixing part 21 is used when the sensor plate 10 is fixed to the base frame 6 by the bolt 16 (see FIG. 2B).

In this sensor plate 10, additionally, bolt hole 22a is formed on each displacement part 22, respectively. This bolt hole 22a is used for joining the convection parts 9c and 9c with the displacement parts 22. To be more precise, the displacement parts 22 and arm 9 are joined together through the convection parts 9c and 9c. Thereby, whereby the arm 9 is turned around the center pin 15, the displacement part 22 of the sensor plate 10 is displaced in compliance with a turn of the arm 9.

Strain gages from R1 to R4 are placed on the path 23. Strain gages R1 and R3 are placed at the vicinity of the displacement part 22 of the path 23, respectively. Strain gages R2 and R4 are placed at the vicinity of the fixing part 21 of the path 23. Each of strain gages R1, R2, R3, and R4 is joined by electric wiring so that the bridge circuit shown in FIG. 3C is provided.

Here, if the displacement part 22 is moved in the direction shown by arrow d3 (shown in FIG. 3B), each of strain gages R1 and R3 receives the tensile load. On this occasion, on the other hand, each of strain gages R2 and R4 receives the compressive load.

Here, the electrical resistance of each of the strain gages R1, R2, R3, and R4 varies depending on the tensile force (load) and the compressive force (load). That is, the electrical resistance of the bridge circuit itself varies depending on the degree of the variation of the electrical resistance of each strain gages R1, R2, R3, and R4.

In the present invention, therefore, the amount of displacement of the displacement part 22, i.e. the amount of the load (weight) to be applied to the vehicle seat 2 can be obtained by measuring the electrical resistance of the bridge circuit. That is, the sensor plate 10 having these configuration's electric wirings acts as the strain gage.

In the present embodiment, preferably, the resistor (not shown), which is used for adjusting the sensitivity, may be provided between the strain gages R1 and R2, and between the strain gages R3 and R4. In the present embodiment, a thermistor 25 which is placed on the protrusion part 21b extending from the fixing part 21, can be example of this resistor.

As shown in FIG. 1A through FIG. 2B, the heat insulator 11, such as a felt, is provided on the base frame 6. That is, the heat insulator 11 positions between the bottom of the vehicle seat 2 and the base frame 6 when the base frame 6 is fixed to the bottom of the vehicle seat 2. To be more precise, the heat insulator 11 is provided at the opposite side with respect to the arm 9.

The width of the heat insulator 11 is approximately same as that of base frame 6. The heat insulator has a sufficient size for covering not only the head of the bolt 16 protruding on the base frame 6 but also the whole of the top surface of the base frame 6.

In the present invention, the base frame 6 and sensor plate 10 are joined by the bolt 16. Thus, if the sudden change of the temperature of the base frame 6 arises as a result of the sudden change of the ambient temperature, this sudden change of the temperature often gives an unfavorable influence on the sensor plate 10. In this occasion, since the resistance of the strain gage (resistors) R1, R2, R3, and R4 is susceptive to the change of the temperature, the accuracy of the obtained data from these strain gage R1, R2, R3, and R4 may be lessened.

In the present invention, therefore, the heat insulator 11 provided on whole of the top surface of the base plate 6. Thereby, since the heat transfer from the base frame 6 to the sensor plate 10 can be prevented, the large change of the temperature of the base frame 6 is prevented. Thus, the defect caused by the sudden change of the temperature can be minimized.

Thereby, since the influence of the change of the ambient temperature can be reduced and the accuracy of the electric resistance of the strain gage from R1 through R4 is improved, the load detection having accuracy can be obtained. Here, the heat insulator 11 may be provided on whole surface of the base frame 6.

Control Unit

The control unit 5, as shown in FIG. 1A and FIG. 1B, is equipped with the CPU and ROM, and is fixed at the fixing member 7a of the vehicle body 7.

The control unit 5 connects with each weight detection unit 4 through a cable 5a. This control unit 5 applies a voltage to each of the bridge circuits and measures the current value streaming the bridge circuit. Thereby, the control unit 5 obtains the value of the resistance (hereinafter indicated as resistance value) of the bridge circuit (strain gage from R1 through R4) by the computing based on the current value. Then, the control unit 5 generates the output signal based on the resistance value of the bridge circuit.

The output signal is supplied to respective control units, such as a control unit of airbag apparatus or a control unit of an indicator on the instrument panel.

In the present invention, as described above, the control unit 5 outputs the output signals, which indicates the resistance value of the bridge circuit. But, the signal to be outputted from this control unit 5 is not limited to this. For example, the control unit 5 may output the signal indicating the unique identification code, such as a category name. In the present embodiment, unique category names are used as this identification code. In this case, the control unit 5 refers to the data base recorded on the ROM and compares the resistance value of the bridge circuit with a threshold value. Then, the control unit 5 performs the categorization based on the obtained resistance value of the bridge circuit. Thereby, in this case, the output signal supplied from the control unit is the signal indicating the selected category name. By adopting this classification (categorization), the handling of the output signal in another unit equipped in the vehicle can be facilitated.

For example, the occupant detection system 1 may categorize the weight of the occupant sitting on the vehicle seat 2 into the category of "High" or "Low" based on the obtained resistance value. Here, "High" means that the weight of the occupant is heavy, and "Low" means that the weight of the occupant is light. This classification is performed by comparing the resistance value with a threshold value.

In the present invention, the categorization of the occupant is performed based on the resistance value of the bridge circuit. Thus, the further detailed classification can be enabled based on the magnitude of the resistance value. Thereby, the categorization of the occupant such that the occupant sitting on the vehicle seat is "child" or "adult" or "woman" can be realized.

Detection of Occupant

Next, the detection of the occupant performed by the occupant detection system 1 utilizing the weight will be explained.

When the occupant is not sitting on the vehicle seat 2, the load corresponding to the weight of the vehicle seat 2 is applied to the weight detection unit 4.

This load acts in the directions which depresses the base frame 6 downwardly (the direction shown by arrow d1 in FIG. 2B). Thus, the base frame and the fixing part 21 of the sensor plate 10 are pushed downwardly. In this occasion, on the other hand, since the bracket 8 is fixed at the vehicle body 7, the bracket 8 is not moved downwardly.

Thereby, the load which acts in the direction shown as arrow d2 in FIG. 2B is applied to the end part 9a of the arm 9. Here, since the center pin 15 is provided, when end part 9a is moved in the direction shown as arrow d2, the convection part 9c is moved in the direction shown as arrow d3 in FIG. 2B.

Thus, the displacement part 22 is also moved in the direction shown as arrow d3. Thereby, a moment of force is applied to the sensor plate 10, and deformation of the sensor plate 10 thus occurs.

Here, the detailed explanation about the deformation of the sensor plate 10 will be explained. The deformation of the sensor plate 10 is caused by the relative displacement between the fixing part 21 and the displacement part 22.

If the deformation of the sensor plate 10 arises, as shown in FIG. 3B, the strain gages R1 and R3 at the vicinity of the displacement part 22 receives the tensile force (load). In this occasion, on the other hand, the strain gages R2 and R4 at the vicinity of the fixing part 21 receives the compressive force (load). This is because the direction of the displacement of the displacement part 22 agrees with the arranging direction of the strain gages from R1 through R4. In other words, this is because the displacement part 22 deforms along the arranging direction of the strain gages.

Thereby, the resistance value of the strain gages R1 and R2 decreases in compliance with the variation amount of the displacement part 22, and the resistance value of the strain gages R2 and R4 increased in compliance with the variation amount of the displacement part 22. Thus, the resistance value of the bridge circuit as the whole fluctuates in compliance with the variation amount of the displacement part 22.

In the present invention, therefore, the presence or absence of occupant on the vehicle seat 2 can be detectable by measuring the resistance value of the bridge circuit, which varies in compliance with the variation of the load to be applied to the vehicle seat 2.

When using the occupant detection system 1, there may occur a sudden change (drop or rise) of the ambient temperature around the occupant detection system 1 or the temperature of the vehicle seat 2.

As an example of this case, 1) the sudden change of the temperature due to the operation of the air conditioner equipped in the vehicle, 2) the sudden change of the temperature due to the operation of the door or window of the vehicle, would be cited.

If this sudden change of the temperature occurs while the weight detection unit 4 is detecting the presence of the occupant, the measurement result (resistance value) of the bridge circuit may be affected by this sudden change of the temperature.

In the occupant detection system according to the present invention, the heat insulator 11 is provided in order to circumvent this affection. By providing the heat insulator 11, since the temperature of the sensor plate 10 does not change even if the sudden change of the ambient temperature occurs, the resistance value of the strain gages from R1 through R4 is not heavily influenced by the change of the ambient temperature. Thus, the control unit 5 will never generate an extraordinary output due to the measurement error.

Here, the lessening of the accuracy of the measurement result is an example of the influence due to the sudden change of the temperature. The lessening of the accuracy is caused for the following reasons. That is, if the thermal diffusion from the sensor plate 10 occurs, the temperature of the region around the strain gages R1 may differ from the temperature of other regions around the strain gages R2, R3, and R4, respectively. This temperature difference may also occur in the region around other strain gages.

In this case, since the measurement of the resistance value of each strain gages R1, R2, R3, and R4 is performed in the different temperature condition, since the resistance of strain gage R1, R2, R3, and R4 is susceptive to the change of the temperature, the accuracy of the obtained data from these strain gages R1, R2, R3, and R4 may be lessened.

Additionally, if the temperature of the strain gages R1 to R4 differs from the temperature of the thermistor 25, the function of the thermistor 25 may not fully be demonstrated. This is also an example of the influence due to the sudden change of the temperature.

As described above, the weight detection unit 4 measures the change of the weight of the vehicle seat 2 as the variation of the resistance value. Thus, the presence or absence of the occupant on the vehicle seat and the weight of the occupant can be measured based on the variation of the resistance.

In the present invention, furthermore, since the heat transmission between the base frame 6 and the sensor plate 10 is prevented by the heat insulator 11, the detection of the occupant can be achieved even if this occupant detection system is operated under the environment, in which the sudden change of the temperature frequently arises.

Application of the Occupant Detection System

The occupant detection system 1 according to the present invention would be suitable for the use in the airbag apparatus.

The airbag apparatus deploys the airbag in order to secure the occupant against injury in the event of collision of vehicle. In recent years, the airbag apparatus, which determines whether or not to deploy the airbag after checking the presence of the on the vehicle seat, or after checking the physique or sitting position of the occupant, has been known.

By adopting the present invention's occupant detection system 1 to these conventional airbag apparatus, checking of whether the occupant is on the vehicle seat, checking of whether the occupant sitting on the vehicle seat is adult or child, checking of whether the weight of the occupant sitting on the vehicle seat is heavy, and checking of whether the sifting position of occupant is foreside of the vehicle seat, can be performed. Thereby, the inflation of the airbag can be controlled.

Although there have been disclosed what is the present embodiment of the invention, it will be understood by persons skilled in the art that variations and modifications may be made thereto without departing from the scope of the invention, which is indicated by the appended claims.

Another Embodiment of Sensor Plate

Figure 4:
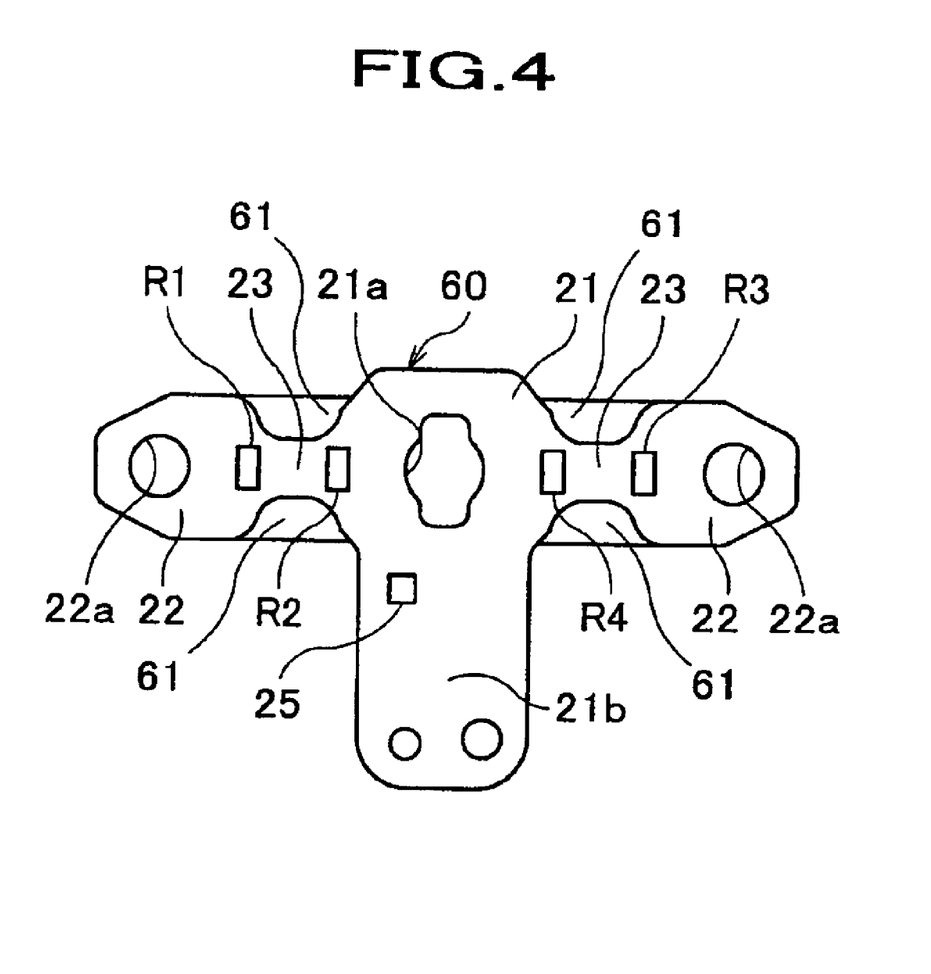
FIG. 4 is a bottom view of the sensor plate of another configuration.

For example, the sensor plate 60 shown in FIG. 4 may be adoptable instead of the above described sensor plate 10.

In this sensor plate 60, a thermal conductive substance 61 is provided at both sides of the path 23.

In other words, this thermal conductive substance 61 is provided at the area ranging from the region near the strain gage R2 (R4) near the fixing part 21 to the region near the strain gage R1 (R3) near the displacement part 22.

By providing this thermal conductive substance 61, since this thermal conductive substance 61 has a contact with the fixing part 21 and the displacement part 22, and the path 23, the heat applied to the fixing part 21 is rapidly diffused to the displacement part 22 and the path 23 through the thermal conductive substrate 6. Thereby, the temperature of the fixing part 21, the displacement part 22, and the path 23 are equalized, respectively. Thus, the temperature of the strain gages R1, R2, R3, and R4 are also equalized, and the accuracy of the resistance value obtained from the bridge circuit is improved.

When the sensor plate 60 is used in the weight detection unit 4, the heat transmission characteristic within the path 23 is improved due to the thermal conductive substance 61. Thereby, in the weight detection unit 4 adopting this sensor plate 60, the occurrence of the difference in the temperature between some of the strain gage and others of the strain gages can be prevented, due to this heat transmission characteristic of the thermal conductive substance 61 in addition to the insulation characteristic of the heat insulator 11. Thus, the influence of the sudden temperature change of ambient temperature can be minimized.

The thermal conductive substance 61 used in the present invention is made of substances having a suitable thermal conductivity. Various types of materials, such as a deformable thin plate or film, are adoptable as this thermal conductive substance 61. In the present invention, the thermal conductive substance 61 is provided at both sides of the path 23. But the arrangement of the thermal conductive substance 61 is not limited to this. For example, this thermal conductive substance 61 may be provided at one side of the path 23.

In the present invention's occupant detection system adopting the sensor plate 60, the heat insulator 11 is not necessarily required on the base frame 6. This is because the thermal conductive substance 61 absorbs the influence of the ambient temperature.

In the present invention, the occupant detection system 1 may check whether the occupant is sitting at the fore-side of the vehicle seat 2 or the rear-side of the vehicle seat 2, by comparing the resistance value of the strain gages R1 and R2 with the resistance value of the strain gages R3 and R4.

In the present invention, furthermore, the occupant detection system 1 may check whether the occupant is sitting at the right-side of the vehicle seat 2 or the left-side of the vehicle seat 2, by comparing the resistance value of the bridge circuit of the weight detection unit provided at the one side of vehicle seat with the resistance value of the bridge circuit of the weight detection unit provided at the other side of the vehicle seat.

In the present invention, the base frame 6 of the weight detection unit 4 is fixed to the bottom of the vehicle seat 2 and the bracket 8 of the weight detection unit 4 is fixed to the vehicle 7 side. But the arranging manner of the weight detection unit is not limited to this. For example, the arranging manner, in which the base frame 6 of the weight detection unit 4 is fixed to the vehicle 7 side, and the bracket 8 of the weight detection unit 4 is fixed to the bottom of the vehicle seat 2, can de adoptable. Additionally, a pressure sensor may be adoptable instead of the strain sensor.

What is claimed is:

1. An occupant detection system comprising:
   a sensory, which measures a weight of an occupant sitting on a vehicle seat;
   a controller, which detects a presence of said occupant said vehicle seat;
   a base frame, which in fixed to one of the vehicle seat and a vehicle body and accommodates said sensor;

a heat insulator, which is provided on said base frame in spaced relation to said sensor and, a connecting member, which connects the sensor and the base frame and is partially exposed on the base frame, wherein the heat insulator covers the exposed part of the connecting member to substantially prevent convective heat transfer between an ambient environment and said base frame and said sensor.

2. An occupant detection system according to claim 1, wherein said sensor is a strain gage, which includes a plurality of resistive elements, and said sensor has a thermal conductive substance, which decreases temperature difference among said resistive elements, said thermal conductive substance is formed as one of a thin film and a plate.

3. An occupant detection system according to claim 1, wherein said base frame has a substantially U-shape cross section opening downward and said heat insulator is disposed on an upper surface of said base frame.

4. An occupant detection system according to claim 2, wherein said thermal conductive substance is provided in the vicinity of the strain gage.

5. An occupant detection system according to claim 2, wherein the stain gage is stored within the base frame, and is provided on a sensor plate which receives a load added to a vehicle seat, and wherein the thermal conductive substance is attached to the sensor plate.

6. An occupant detection system according to claim 5, wherein said sensor plate comprises:

a fixing part which is fixed to the base frame;

a displacement part which receives the load added to the vehicle seat; and a path which connects the fixing part to the displacement part;

wherein the strain gage is disposed on the path.

7. An occupant detection system according to claim 6, wherein said path includes a pair of strain gages, one of which is placed in the vicinity of said fixing part, and the other of which is placed in the vicinity of said displacement part.

8. An occupant detection system according to claim 7, wherein the control unit measures an electric resistance of each of said strain gauges, and determines whether an occupant is on said vehicle seat base on said electric resistance.

9. An occupant detection system comprising:

a weight detection unit, which is placed between a bottom of a vehicle seat and a floor of a vehicle, wherein said weight detection unit includes:

a load receiver, which receives a load applied to said vehicle seat, a load detector, which generates a signal in compliance with a load received by said load receiver, a load transmitter, which transmits a load received by said load receiver to said load detector, and a receptacle, which accommodates said load detector, said load receiver, and said load transmitter;

a control unit, which determines whether an occupant is on said vehicle seat based on said signal generated by said iced detector;

a heat insulator, which is provided on the top surface of said receptacle in spaced relation to said load detectors; and a connecting member which connects the load receiver and the receptacle, and is exposed on the receptacle, wherein the heat insulator substantially prevents convective heat transfer between an ambient environment and said receptacle and said load receive.

10. An occupant detection system according to claim 9, wherein, said load detector comprises:

a sensor plate, which receives a load that is received said load receiver and is transmitted through said load transmitter; and a strain gage, which is provided with said sensor plate, and measures distortion of said sensor plate caused by said load transmitted through said load transmitter; wherein said control unit determines whether an occupant is on said vehicle seat based on a level of a load which is estimated from said distortion measured by said strain gage.

11. An occupant detection system according to claim 10, wherein said sensor plate comprises:

a fixing part, which is fixed to said receptacle; and a pair of displacement parts, which are provided at both sides of said fixing part, wherein one side of each said displacement part is connected to said fixing part through a path, and the other side of each said displacement part is connected to said load transmitter.

12. An occupant detection system according to claim 11, wherein said path has a pair of strain gages, one of which is placed at a vicinity of said fixing part, and the other of which is placed at a vicinity of said displacement part.

13. An occupant detection system according to claim 12, wherein said control unit measures electric resistance of each said strains gages, and determines whether an occupant is on said vehicle seat based on said electric resistance.

14. An occupant detection system according to claim 11, wherein said sensor plate has at least one thermal conductive substance, which thermally connects said fixing part, said path, and said displacement parts to each other, whereby temperature of said fixing part, said path, and said displacement parts are equalized, said thermal conductive substance is formed as one of a thin film and a plate.

15. An occupant detection system according to claim 14, wherein said thermal conductive substance is provided between the fixing part and the displacement parts.

16. An occupant detection system according to claim 14, wherein said thermal conductive substance is provided in the vicinity of the strain gage.

17. An occupant detection system according to claim 9, comprising two of said weight detection units, a first weight detection unit, which is placed at one side in the width direction of said vehicle seat, and a second weight detection unit, which is placed at other side in the width direction of said vehicle seat, and wherein said control unit further determines whether an occupant is sitting on either of said sides of said vehicle seat by comparing the signal, which is generated by said load detector of said first weight detection unit, with the signal, which is generated by said load detector of said second weight detection unit.

18. An occupant detection system according to claim 9, wherein said control unit determines whether an occupant sitting on said vehicle seat is adult by comparing the signal generated by said load detector with a threshold value.

19. An occupant detection system to claim 9, said wherein said receptacle has a substantially U-shape cross section opening downward.

* * * * *

UNITED STATES PATENT AND TRADEMARK OFFICE
CERTIFICATE OF CORRECTION

PATENT NO. : 6,928,889 B2
DATED : August 16, 2005
INVENTOR(S) : Mikihito Kojima et al.

It is certified that error appears in the above-identified patent and that said Letters Patent is hereby corrected as shown below:

Column 1,
Line 32, change "through a movable part Here," to -- through a movable part. Here, --.
Line 40, change "from the strain gages and" to -- from the strain gage and --.
Line 56, change "of each parts of the plate" to -- of each part of the plate --.

Column 3,
Line 12, change "Along hole 12 and a bolt hole 13" to -- A long hole 12 and a bolt hole 13 --.
Line 45, change "provided is he vicinity of end part" to -- provided is the vicinity of end part --.

Column 6,
Line 4, change "This load acts in the directions" to -- This load acts in the direction --.
Line 6, change "Thus, the base frame" to -- Thus, the base frame 6 --.
Line 37, change "R2 and R4 increased in compliance" to -- R2 and R4 increase in compliance --.

Signed and Sealed this

Twenty-first Day of February, 2006

JON W. DUDAS
*Director of the United States Patent and Trademark Office*